United States Patent [19]

Post

[11] 4,069,191

[45] Jan. 17, 1978

[54] METAL PATCHING COMPOSITION AND METHOD

[76] Inventor: John F. Post, Riamede Farm, Chester, N.J. 07930

[21] Appl. No.: 662,435

[22] Filed: Mar. 1, 1976

Related U.S. Application Data

[62] Division of Ser. No. 474,781, May 30, 1974, abandoned.

[51] Int. Cl.² ............................................. C08L 63/02
[52] U.S. Cl. .............................. 260/37 EP; 260/37 N
[58] Field of Search ..................................... 260/37 EP

[56] References Cited

U.S. PATENT DOCUMENTS

| | | | |
|---|---|---|---|
| 2,944,036 | 7/1960 | Floyd et al. | 260/37 EP X |
| 3,030,329 | 4/1962 | Warnsdorfer | 260/37 EP |
| 3,773,706 | 11/1973 | Dunn | 260/37 EP |

FOREIGN PATENT DOCUMENTS 960,276  6/1964  United Kingdom ............ 260/37 EP

OTHER PUBLICATIONS

Lee et al.; HANDBOOK OF EPOXY RESINS; McGraw-Hill Book Co.; 1967; pp. 14–24; Sci. Lib.

Primary Examiner—Lewis T. Jacobs
Attorney, Agent, or Firm—John F. Post

[57] ABSTRACT

A metal patching method and composition wherein the method comprises mixing two components and then heating to cure the mixture, one of the components containing a diazo dye which changes color when the mixture is cured. The composition of one component includes a bisphenol A epoxy resin, a diazo dye and a flow controlling agent of the temperature insensitive type, and the second component includes a polyamide resin and a flow controlling agent of the temperature insensitive type.

7 Claims, No Drawings

METAL PATCHING COMPOSITION AND METHOD

This is a division of application Ser. No. 474,781, filed May 30, 1974, now abandoned.

BACKGROUND OF THE INVENTION

The present invention relates generally to a metal patching method and composition and more particularly to a two component system which is heat cured, the composition changing color when curing is complete. Various metal patching systems are known in the art. Such systems are used, for example, to seal refrigerator evaporators and patch cracks in metal surfaces of all types. Two types of metal patching materials are generally employed. One type is a two component system, the components being mixed together at room temperature to initiate a reaction which leads to curing or polymerization of the batch composition. A second type employs a single stick in which curing is initiated by the application of heat.

Room temperature cured epoxy systems, such as bisphenol A and an amine system have several disadvantages. For example they are usually made up of relatively short polymer chains which are weaker than the longer polymer chains of heat cured resins. Room temperature cured epoxies also have the disadvantage of being relatively liquid prior to curing so that when applied to the area to be patched, they would flow and not remain in place and consequently it was difficult to patch an overhead or vertical structure. Perhaps the primary disadvantage of room temperature cured epoxies is their relatively long curing time of three to four hours. Some newer epoxy systems employing bisphenol A with mixtures of amines and anhydride curing agents claim a room temperature cure in 5 to 15 minutes. However the cure is only 60 to 70% complete in this time and it still takes up to four hours for the reaction to go to completion.

While heat cured epoxy resins are substantially stronger than the room temperature cured epoxies, they too have several disadvantages. For example they cure very rapidly and therefore it is difficult to control the curing. A typical heat cured system comes in the form of a stick and includes cold mixed bisphenol A and an anhydride curing agent. The metal to be patched is heated and the stick wiped over the heated area. If too much heat was applied to the metal or the heat applied for too long a period, curing is rapid and an overcured or even crystalline structure will result which produces a poor patch. On the other hand too little heat or heat applied for too short a time period will result in an undercured, relatively weak patch.

According to the present invention, however, a two component, heat cured system is provided in which a controlled heat curing cycle is made possible by a color change which occurs in the composition when curing is substantially complete. This guarantees a perfect cure and therefore maximum bond strength. Further, unlike the two component systems of prior art, the present invention is easy to use, stays in place and will not run off during curing even when applied to overhead or vertical structures.

SUMMARY OF THE INVENTION

The present invention may be characterized in one aspect thereof by the provision of a first component including a mixture of bisphenol A, a diazo dye and a temperature insensitive flow controlling agent; and a second component including a mixture of a polyamide resin and a temperature insensitive flow controlling agent; the two components being mixed together in equal volumes and curing initiated by the application of heat wherein the diazo dye is decolorized during the curing and is completely decolorized when curing is substantially complete.

OBJECTS OF THE INVENTION

One object of the present invention is to provide a heat cured epoxy for patching metals and the like having a built-in indicator which indicates when the curing of the epoxy is substantially complete.

Another object of the present invention is to provide a heat cured epoxy wherein curing is indicated by a color change in the epoxy.

A further object of the present invention is to provide a two part metal patching composition, the parts being mixed together and heated to effect the patch and one of the parts containing a dye which chemically reacts during polymerization to change color when curing is complete.

Yet another object of the present invention is to provide a method for patching metal and the like employing a two component heat cured epoxy resin system of the type described.

These and other objects, advantages and characterizing features of the present invention will become more apparent upon consideration of the following detailed description thereof.

DESCRIPTION OF THE PREFERRED EMBODIMENT

The present invention comprises a two component system, the components being kept separate and apart until it is desired to make a patch. One of the components is a mixture which includes a bisphenol A epoxy resin having an epoxy equivalent in the range of 180 to 190. Mixed with the bisphenol A is a diazo dye. The particular dye found most useful for purposes of the present invention is a red dye known as Solvent Red 24 manufactured by American Cyanamide, the dye having a C.I. number of 26105. To the mixture of the bisphenol A and diazo dye, is added a flow controlling agent which increases the thixotropic properties of the mixture. The flow controlling agent should be temperature insensitive, that is, a mineral product. Examples of such products as may be used include an activated asbestos or a fumed silica.

The second component of the composition is a polyamide resin having an amine number of between 90 and 350 and a viscosity of about 115,000 cp at room temperature. To this resin is also added a temperature insensitive flow controlling agent. When making the patch these two components are mixed together in equal volumes and then heated to cure the resin. During heating the mixture undergoes a color change when the curing is substantially complete.

It is important for purposes of the present invention that the dye be incorporated into the bisphenol A component. If incorporated into the polyamide component, a reaction occurs after approximately seven days at room temperature which decolorizes the dye. When the dye is incorporated into the bisphenol A however, no such reaction occurs and the system remains stable until the two components are mixed together.

The viscosity and amine number of the polyamide resin is also critical. It has been found that if the polyamide component has an amine number greater than 350, the heat initiated polymerization proceeds at a faster rate than the color change of the diazo dye and an uneven curing and blistering of the mixture results. On the other hand if the amine number of the polyamide is below 90, the polymerization proceeds at a rate slower than the color change which results in an undercuring of the mixture. Acceptable results are achieved by using a polyamide resin having an amine number of approximately 238. At this level it has been found that the decolorization of the dye and curing occur in approximately the same time intervals, so that the change in color is an indication that the curing is substantially completed.

An example of the formulation of the two components as may be used in the present invention is set out hereinbelow.

| Component I | Parts by Weight |
|---|---|
| 25 lbs. bisphenol A epoxy | 400 |
| 4½ grams Solvent Red 24 dye | 0.15 |
| 11 ounces asbestos fiber | 11 |
| Component II | Parts by Weight |
| 25 lbs. polyamide resin (amine number 238) | 400 |
| 11 ounces asbestos fiber | 11 |

According to the method of the present invention equal amounts of Component I and Component II are mixed together on any clean surface. The mixing should proceed until the mixture has a uniform red color which indicates that there is substantially complete mixing of the two components. The area to be patched should be cleaned and degreased. The mixture is then spread generously over the area to be repaired and a low flame from a propane torch, hot airgun or other source is applied by using slow brush strokes accross the repair area to

I claim:

1. A resinous metal patching material formed by the heat curing of two admixed components, the first component including bisphenol A epoxy resin and a diazo dye, the second component being a polyamide resin having an amine number of between 90 and 350, both components also including a heat insensitive mineral product to increase the thixotropic properties of the components.

2. A material as set forth in claim 1 wherein said polyamide resin has an amine number of about 238.

3. A material as in claim 2 wherein said first component is prepared by mixing 25 pounds bisphenol A epoxy resin, 4½ grams of said dye and 11 ounces of an asbestos fiber and said second component is prepared by mixing 25 pounds of said polyamide resin and 11 ounces of asbestos fiber.

4. A metal patching resinous composition which undergoes a color change upon curing, the composition being formed by mixing substantially equal volumes of a bisphenol A epoxy resin component and a polyamide resin component and then heating to initate the cure, the improvement comprising:
 a. said bisphenol A epoxy resin component being stable at room temperature and including a diazo dye, said diazo dye being Solvent Red 24 having a C.I. number of 26105;
 b. said polyamide resin component including a polyamide resin having an amine number of between 90 and 350; and
 c. said polyamide resin and diazo dye being selected such that the reaction between said bisphenol A epoxy resin and polyamide resin is substantially complete in the same time interval as the reaction producing a color change of said diazo dye.

5. A metal patching composition as in claim 4 wherein said polyamide resin has an amine number of 238.

6. A metal patching composition as in claim 4 wherein each component includes asbestos to improve the thixotropic properties of said components.

7. A metal patching composition as in claim 4 when said bisphenol A epoxy resin component includes 400 parts by weight bisphenol A epoxy resin and 0.15 parts by weight of said diazo dye.

* * * * *

UNITED STATES PATENT AND TRADEMARK OFFICE
CERTIFICATE OF CORRECTION

PATENT NO. : 4,069,191
DATED : January 17, 1978
INVENTOR(S) : John F. Post

It is certified that error appears in the above-identified patent and that said Letters Patent are hereby corrected as shown below:

Column 3, line 39, after "area to" insert -- gently heat the metal and the mixture. It is important that the flame or heat not be held on the mixture as it will char rapidly. When the proper curing temperature is reached, the color of the patch material changes from red to gold. This decolorization indicates a proper cure. Heat should be removed at this point and the repair allowed to cool at room temperature without forced cooling. This allows the curing reaction sufficient time to go to completion. The entire heating, curing and cooling is complete in a relatively short time and produces a patch capable of withstanding temperatures of 300°F and pressures in excess of 300 psi.

Thus, during the course of the heating a reaction occurs which both cures the resins and decolorizes the dye. By the time the dye is completely decolorized the cure is complete and the heat may be removed. The exact nature of the reaction resulting in decolorization of the dye is not known but it is believed that the decolorization result from a chemical reaction and is not a simple heat degradation of the dye. For example, when either Component I or Component II is heated separately no color change occurs.

Thus it should be appreciated that the present invention accomplished its intended objects in providing a composition and method for quickly and easily repairing metal surfaces such as refrigerator evaportors and the like. The color change which occurs prevents overheating and the resultant overcuring and also insures that the bonding reaction takes place under optimum conditions. Since the color change

UNITED STATES PATENT AND TRADEMARK OFFICE
CERTIFICATE OF CORRECTION

PATENT NO. : 4,069,191
DATED : January 17, 1978
INVENTOR(S) : John F. Post

It is certified that error appears in the above-identified patent and that said Letters Patent are hereby corrected as shown below:

occurs in substantially the same time as curing, the decolorization is an indication that the cure is complete and that the heat may be removed. Thus overcuring is prevented and a means is provided for repeatedly obtaining properly cured repairs.

The addition of the flow controlling agents to increase the thixotropic properties of both parts prevents the mixture of components from running off the metal during curing and permits the repair to be made in any position, even overhead.

Having thus described the invention in detail what is claimed as new is: --.

Signed and Sealed this

Ninth Day of May 1978

[SEAL]

Attest:

RUTH C. MASON
Attesting Officer

LUTRELLE F. PARKER
Acting Commissioner of Patents and Trademarks